Figure 1:
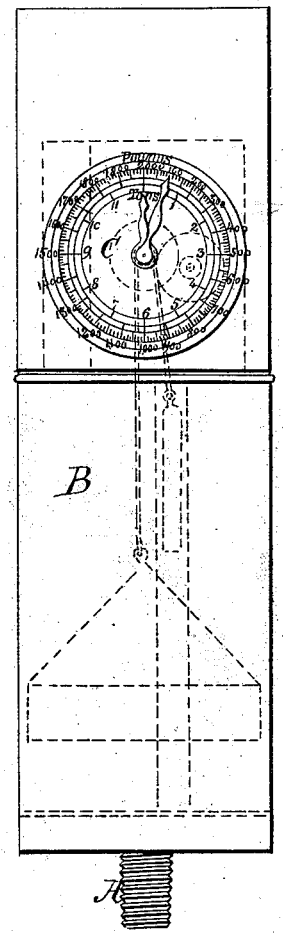
Figure 2:
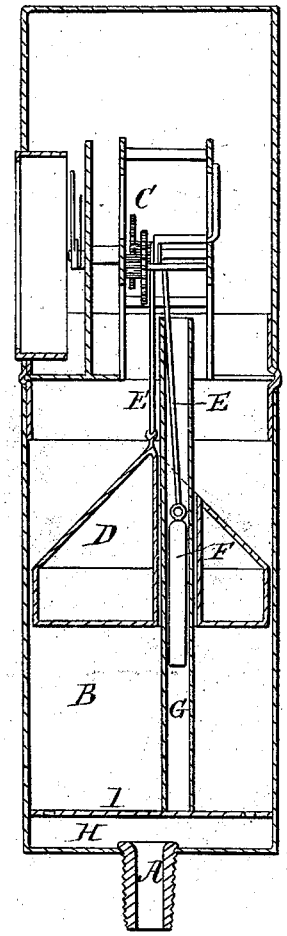
Figure 4:
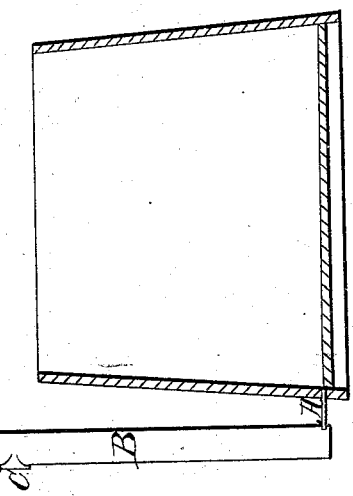
Figure 3:
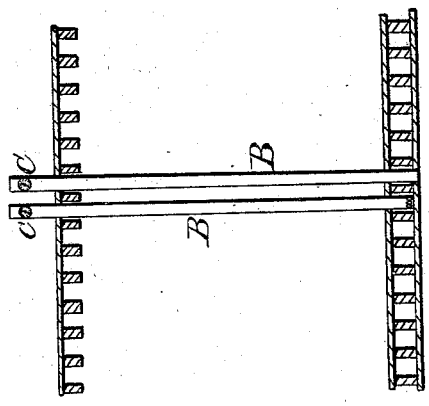

I. R. AMSDEN.
Hydrostatic Scale.

No. 70,312.

2 Sheets—Sheet 1.

Patented Oct. 29, 1867.

Witnesses,

Inventor
Ira R Amsden,

I. R. AMSDEN.
Hydrostatic Scale.

No. 70,312.

2 Sheets—Sheet 2.

Patented Oct. 29, 1867.

Witnesses
B. H. Muehle
Truman C. White

Inventor
Ira R. Amsden

United States Patent Office.

IRA R. AMSDEN, OF BUFFALO, NEW YORK.

Letters Patent No. 70,312, dated October 29, 1867.

---

IMPROVED HYDROSTATIC SCALES.

---

The Schedule referred to in these Letters Patent and making part of the same.

---

TO ALL WHOM IT MAY CONCERN:

Be it known that I, IRA R. AMSDEN, of the city of Buffalo, county of Erie, and State of New York, have invented certain new and useful Improvements in Hydrostatic Scales, or apparatus for ascertaining the weight of cargo of canal-boats or other vessels while lying in the water, and for other weighing purposes; and I do hereby declare that the following is a full, clear, and exact description thereof, reference being had to the accompanying drawings, making a part of this specification, in which—

Figure I is a front elevation.

Figure II, a vertical section.

Figure III is a section of a vessel, showing my improvement as a bilge-water indicator.

Figure IV is a view showing my improvement as adapted to measuring liquids in tanks or reservoirs.

My improvement consists in the use of peculiar mechanism with a dial and one or more revolving hands capable of continuous revolutions, and of different speed, for registering the weight or measurement ascertained by hydrostatic methods; also, in the combined use of two such scales in boats and vessels, one for ascertaining any leakage, and showing at all times the depth of bilge-water, which must be known, and placed at a certain depth by pumping, before the true weight of cargo can be shown by the other scale used for ascertaining said weight; also, in the construction of the cylinder of such scales so as to protect more than heretofore the buoy or float from the sudden rush of water when passing in and out of the cylinder.

The scale is attached to the boat by the tube A and cylinder B being connected with the water outside of the boat through the bottom in the common way, and at the centre or dead-point, except when in old boats it may be deemed necessary to use two such scales, one placed at each end of the midship. The register C is attached to the cover of the cylinder, through which there is an opening to admit of the buoy D operating on the mechanism, which is done by a cord or chain, E, one end of which is attached to the buoy and the other is passed up over the shaft from left to right, and attached to the weight F. The buoy is then placed in the cylinder, the weight in the tube G, and the cover with register shut down on the cylinder. The buoy being twice the heft of the weight drops to the bottom of the cylinder and floats on the water that has passed therein from the boat's own light weight. The bilge-water is pumped to a certain depth, and the hands are set pointing to the top of the dial. I then proceed to graduate the dial by putting on draughts of one thousand pounds each, marking where each hand points on the dial for each draught until the boat is freighted to about one-half its capacity. The spaces for pounds are then divided into hundreds and fractions thereof, and those for tons marked off into ton-spaces, when the dial is replaced and the scale is ready for use.

The same apparatus, as shown in Fig. III, is attached so as to detect leakage and measure the depth of bilge-water by inserting the cylinder B through the floor of the boat to the bottom of the hold. When there is no water in the boat the buoy will rest on the bottom, and the hands will point to the top of the dial. As the boat leaks the buoy will rise, and the depth of same will be shown on the dial already marked into inches and fractions thereof; and by inserting the pipe A into the chamber H on the side of the cylinder, instead of through the bottom, (this chamber H at the lower end is formed by inserting the perforated diaphragm I, as shown in Fig. II,) the same apparatus can be attached to tanks and reservoirs and the dial graduated so as to always show in gallons and barrels the liquids therein contained, as shown by Fig. IV. My method of registering the weight ascertained by such scales is more compact, can be located above or below deck, as desired, and always ready for use wherever located. The buoy responds promptly and more accurately to the least action of the water in the cylinder, while the dial can give ten-inch space for the one-eighth of an inch of water displaced by every thousand pounds of the boat's cargo, thus making the scale more valuable for this and other weighing purposes; all of which renders it an improvement over all former methods for the same purpose.

What I claim as my invention, and desire to secure by Letters Patent, is—

1. The use of mechanism with a dial and one or more revolving hands, when applied to hydrostatic scales, substantially as and for the purposes set forth.

2. The combination of the cylinder B, buoy D, with the cord or chain E and weight F, substantially as and for the purpose described.

3. The tube G, in combination with the weight F and buoy D, for the purpose and substantially as described.

4. The chamber H, for the purposes and substantially as set forth.

5. The application and use of the apparatus herein described as a bilge-water indicator or a liquid-gauge, substantially as described.

IRA R. AMSDEN.

Witnesses:
TRUMAN C. WHITE,
B. H. MUEHLE.